Oct. 30, 1945.　　　　D. P. KEARNEY　　　　2,387,911

AUTOMATIC CONTROL FOR INTERNAL-COMBUSTION ENGINES

Filed July 3, 1940

Witness:
Burr W. Jones

INVENTOR.
Daniel P. Kearney
BY Clinton S. Janes.
ATTORNEY.

Patented Oct. 30, 1945

2,387,911

UNITED STATES PATENT OFFICE 2,387,911

AUTOMATIC CONTROL FOR INTERNAL-COMBUSTION ENGINES

Daniel P. Kearney, Birmingham, Mich., assignor to Bendix Aviation Corporation, South Bend, Ind., a corporation of Delaware Application July 3, 1940, Serial No. 343,793

3 Claims. (Cl. 74—472)

The present invention relates to an automatic control for internal combustion engines and more particularly to a device for momentarily deenergizing an engine in order to facilitate the shifting of a variable speed transmission driven thereby.

In automotive power plants employing variable speed transmissions, it is customary to relieve the load on the transmission while shifting from one ratio to another. When a disconnectable clutch is not provided between the engine and transmission, this object may be secured by deenergizing the engine during the shifting operation. In installations of this character in which the transmission is shifted automatically, it is desirable that the deenergizing of the engine be synchronized with the automatic shifting means. It is also desirable that the engine be restored to operative condition after a brief time interval even though the shifting means should fail to complete its cycle of operation for any reason.

It is an object of the present invention to provide a novel device for momentarily deenergizing an internal combustion engine in synchronism with the shifting of a variable speed transmission driven thereby.

It is another object to provide such a device in which the deenergization of the engine is controlled by the shifting means for the variable speed transmission.

It is a further object to provide such a device in which the operativeness of the engine is restored automatically after a predetermined time interval even though the shifting means should fail to complete its operation.

It is another object to provide such a device in which said time interval is determined in a positive and reliable manner.

It is another object to provide such a device which does not require extensive modification of existing types of structure in order to incorporate this improvement.

Figure 1:
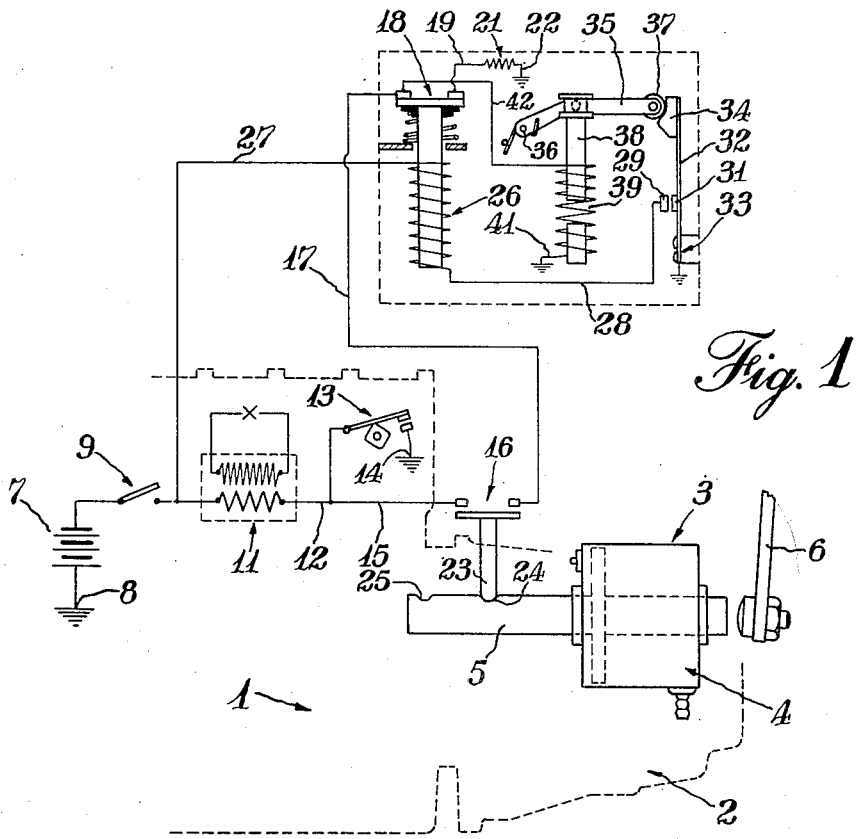
Figure 2:
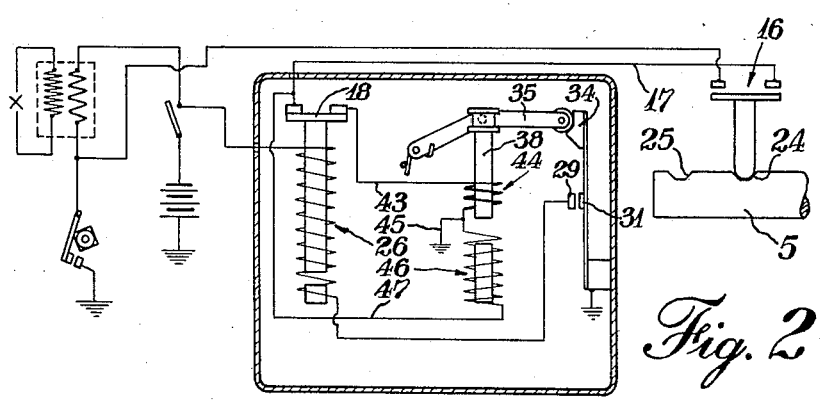

Further objects and advantages will be apparent from the following description taken in connection with the accompanying drawing in which:

Fig. 1 is a semi-diagrammatic illustration of a power plant incorporating a preferred embodiment of the invention; and Fig. 2 is a semi-diagrammatic illustration of a second embodiment of the invention.

In Fig. 1 of the drawing there is indicated in dotted lines at 1 the outline of an internal combustion engine and at 2 a variable speed transmission housing of conventional form. On the housing 2 there is mounted in any suitable manner an automatic shifting unit 3 for the transmission comprising a vacuum chamber 4, a movable shift member in the form of a slidable rail 5, and a gear shift lever 6. This unit forms no part of the present invention so that further description thereof is deemed unnecessary except to state that the transmission gears are shifted by this unit under any desired form of automatic control.

A conventional form of ignition system for the internal combustion engine 1 is provided in the form of a battery 7 grounded at 8 and connected through an ignition switch 9 to an ignition coil 11. The primary circuit of the ignition coil is completed through a lead 12 to the breaker mechanism 13 which is grounded at 14.

According to the present invention, means are provided for deenergizing the internal combustion engine 1 responsive to the initial shifting movement of the rail 5 in order to relieve the transmission of driving load during the shifting operation. As here shown, this is accomplished by providing a grounding circuit for the ignition coil, which grounding circuit is closed by initial movement of the shift rail and is maintained closed until the shift is completed. The grounding circuit comprises a lead 15 connecting the coil lead 12 to a normally open switch 16. Switch 16 is connected by lead 17 to a normally closed switch 18. Switch 18 is connected by a lead 19 through a resistor 21 of small value to the ground at 22.

Means for closing the switch 16 responsive to initial movement of the shift rail 5 is provided in the form of a plunger 23 having a rounded end normally engaging in a notch 24 in the shift rail. The length of plunger 23 is such that when it is raised out of the notch 24 by the sliding movement of the rail 5, the switch will be held closed. A notch 25 is provided in the rail 5 in position to receive the plunger 23 when the shifting movement is completed, in order to permit switch 16 to open and restore the operative condition of the engine ignition system.

Means are provided for restoring the operative condition of the engine after a predetermined time interval irrespective of the operation of the shifting mechanism in order that the engine may not be rendered inoperative in case the shift mechanism should fail to complete its cycle for any reason. As here shown, this function is accomplished by means of a solenoid 26 for opening the normally closed switch 18, which solenoid is incorporated in a control circuit comprising a lead 27 connected to the ignition switch 9 and a lead 28 connected to a fixed contact 29. A contact 31 adapted to cooperate with contact 29 is mounted on a flexible reed 32 fixedly anchored and grounded at one end at 33 and provided with a pendulous weight or bob 34 on its free end. Means for normally holding the contact 31 out of engagement with contact 29 is provided in the form of a bell crank lever 35 pivoted at 36 and having a roller 37 on its free end engaging the bob 34. A magnetic plunger 38 is connected to an intermediate point of lever 35, and a coil 39 is arranged when energized to attract the plunger 38 so as to move the lever 35 to release the bob 34 and allow the contact 31 to come to rest against the contact 29 after a predetermined period of vibration. Coil 39 is grounded at one end at 41 and is connected by lead 42 to the lead 17 of the grounding circuit.

In the operation of this embodiment of the invention, closure of the ignition switch 9 energizes the ignition system for the engine in the usual manner, the grounding circuit being open at switch 16 and the control circuit for switch 18 being open since contact 31 is held away from contact 29. When shifting of the gears in the transmission is to take place, initial sliding movement of the rail 5 to the right raises the plunger 23 out of the notch 24, closing switch 16, and since switch 18 is already closed, the grounding circuit is completed through the resistor 21. The value of the resistor 21 is so low that the ignition coil 11 is rendered inoperative so that the engine is momentarily deenergized. When the shift is completed, the plunger 23 drops into the notch 25, thus permitting switch 16 to open and restore the ignition system to operative condition. It will be understood that this entire operation takes place in about one-tenth of a second so that the time during which the engine is inoperative is substantially inappreciable.

When the grounding circuit is completed, a current flows through lead 42 to the coil 39 which operates to withdraw the lever 35 and permit contacts 31, 29 to close. Due to the pendulous mounting of the contact 31, however, it will vibrate for a predetermined time before coming to rest against contact 29, and during this time the self-inductance of the coil 26 prevents its being energized sufficiently to open the switch 18. If for any reason, however, the shift should be incomplete and the shift rail 5 should stick at an intermediate position, thus holding closed the switch 16, then after the predetermined time interval has elapsed, contacts 31, 29 will close and coil 26 will operate to open switch 18 and thereby open the grounding circuit and restore the operativeness of the engine. Coil 39 is maintained energized as long as the switch 16 is held closed by the shift rail 5, so that the grounding circuit will be held open by the switch 18 until the inoperative condition of the transmission shifting means has been corrected and the shifting operation completed. When this happens, switch 16 opens and the parts are restored to their original positions.

In the embodiment of the invention illustrated in Fig. 2, the engine ignition system and the shift controlled switch are the same as in the embodiment previously described and the elements thereof are similarly numbered. In this embodiment, however, the normally closed switch 18 instead of being grounded through a resistor is connected by a lead 43 to a pull-down coil 44 for the plunger 38, which pull-down coil is of low resistance and is grounded at 45. A holding coil 46 for the plunger 38 of comparatively high resistance is also grounded at 45 and is connected by a lead 47 to the grounding circuit lead 17. The resistance of the pull-down coil 44 is so small that when the grounding circuit is closed therethrough, the engine ignition will be rendered inoperative and the engine deenergized. The resistance of the holding coil 46 is so great, however, that the current which traverses this coil has no appreciable effect on the efficiency of the ignition system.

In the operation of this embodiment of the invention, closure of the ignition switch 9 energizes the ignition in the usual manner, the grounding circuit being open at switch 16 and contacts 29, 31 being held open by lever 35. Upon initial shifting movement of the rail 5, closure of switch 16 completes the grounding circuit through switch 18 and coil 44 to the ground at 45, thus rendering the ignition inoperative and permitting the shifting operation to proceed. If such operation proceeds normally, the switch 16 is reopened upon the completion of the shifting movement of rail 5, and the energization of the engine is thus restored. Energization of coil 44 by the grounding circuit causes the plunger 38 to move the lever 35 out of engagement with the bob 34 so that if the shift rail 5 sticks for any reason, contacts 31, 29 will close after the predetermined period of vibration, thus energizing coil 26 to open switch 18. The grounding circuit is thus opened, restoring the operativeness of the engine while coil 46 remains energized to hold down the lever 35 and allow contacts 31, 29 to remain closed as long as the rail switch 16 is closed.

When the abnormal condition of the transmission is corrected and the shift completed, opening of the rail switch 16 permits the parts to return to their normal positions.

Although but two embodiments of the invention have been shown and described in detail, it will be understood that other embodiments are possible and various changes may be made in the design and arrangement of the parts without departing from the spirit of the invention as defined in the claims appended hereto.

What is claimed is:

1. In combination with a variable speed transmission control for internal combustion engines including a movable shift member, an engine ignition system including a battery, an ignition switch and ignition coil, a grounding circuit for said ignition coil including a normally open switch, means responsive to initial movement of the shift member for closing said normally open switch, a normally closed magnetic switch in the grounding circuit, a control circuit for the magnetic switch, means energized by closure of the grounding circuit for causing closure of the control circuit, and means for preventing effective energization of the magnetic switch for a predetermined time after energization of the closing means for the control circuit.

2. In combination with a variable speed transmission control for internal combustion engines including a shift member, an engine ignition system, a grounding circuit for the ignition system including a normally open switch, means operated by initial movement of the shift member for closing the normally open switch, a normally closed magnetic switch in the grounding circuit, a control circuit for the magnetic switch including a fixed contact and a pendulously mounted contact, means normally holding said pendulously mounted contact out of engagement with the fixed contact, and magnetic means energized by closure of the grounding circuit for releasing said holding means, said pendulously mounted contact being arranged to vibrate a predetermined time before coming to rest against the fixed contact.

3. The combination set forth in claim 2 in which the magnetic releasing means includes a coil of low resistance connected in series in the grounding circuit between the magnetic switch and the ground, and a holding coil of high resistance connected between the shift-operated switch and the ground.

DANIEL P. KEARNEY.